US006409445B1

United States Patent
Beale et al.

(10) Patent No.: US 6,409,445 B1
(45) Date of Patent: Jun. 25, 2002

(54) PUSH PIN WITH ROTATABLE ANCHOR SECTION

(76) Inventors: James R. Beale, 1227 Big Bend Rd., Manchester, MO (US) 63021; Michael A. Prugger, 5532 Duessel La. #A, St. Louis, MO (US) 63128

( * ) Notice: Subject to any disclaimer, the term of this patent is extended or adjusted under 35 U.S.C. 154(b) by 0 days.

(21) Appl. No.: 09/769,042

(22) Filed: Jan. 24, 2001

(51) Int. Cl.[7] .................................................. F16B 15/00
(52) U.S. Cl. ...................................... 411/439; 411/487
(58) Field of Search ................................ 411/480, 439, 411/400, 392, 923, 453, 487

(56) References Cited

U.S. PATENT DOCUMENTS

| 868,111 | A | * | 10/1907 | Neider |
| 1,284,734 | A | * | 11/1918 | Mailanen |
| 2,192,643 | A | * | 3/1940 | Kennedy |
| 3,277,769 | A | * | 10/1966 | Lippmeier |
| 3,330,012 | A | * | 7/1967 | Hart |
| 4,437,286 | A | * | 3/1984 | Maguire |
| 5,096,149 | A | * | 3/1992 | Riese |
| 5,433,569 | A | * | 7/1995 | Fall |

* cited by examiner

Primary Examiner—Flemming Saether
(74) Attorney, Agent, or Firm—Henderson & Sturm LLP

(57) ABSTRACT

A push pin construction (10) for attaching at least one sheet of material (200) to a cubicle wall (100) wherein the construction (10) includes an elongated shaft member (20) having a pointed outboard end (22), a blunt inboard end (23) and a helical anchor section 24 formed intermediate the aligned ends (22), (23). In addition, the shaft member (20) is further provided with a flattened flange (25) disposed proximate to the blunt end (23) which are both embedded in a push head member (30) having an outwardly projecting lip (32) disposed on the distal end and an outwardly projecting tab (33) formed on the proximal end of the push head member (30).

14 Claims, 1 Drawing Sheet

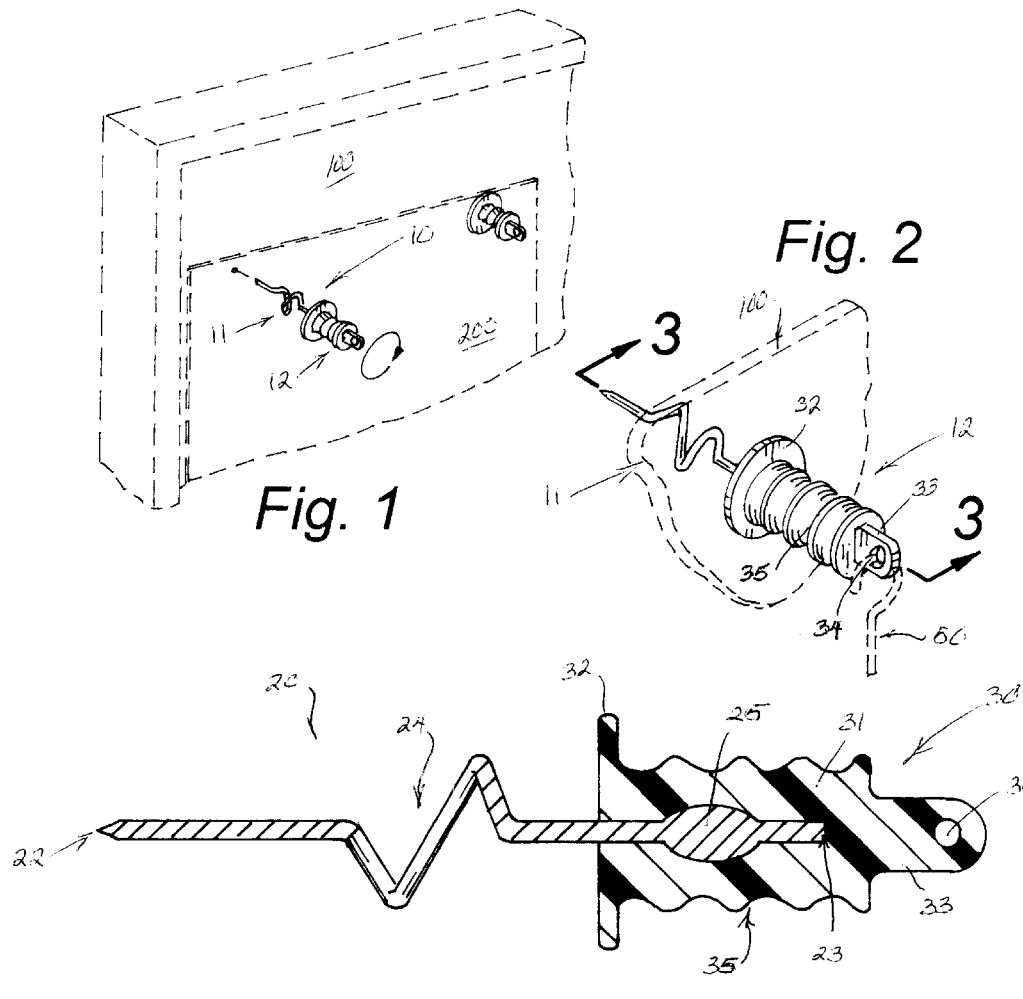
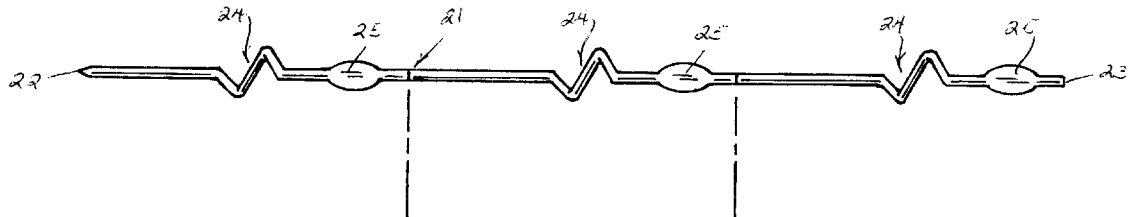

PUSH PIN WITH ROTATABLE ANCHOR SECTION

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of push pins in general and in particular to a push pin having an intermediate helical anchoring section.

2. Description of Related Art

As can be seen by reference to the following U.S. Pat. Nos. 4,897,007; 5,018,697; 5,370,487; and 6,042,078, the prior art is replete with myriad and diverse push pin and other anchoring or suspended support structures.

While all of the aforementioned prior art constructions are more than adequate for the basic purpose and function for which they have been specifically designed, they are uniformly deficient with respect to their failure to provide a simple, efficient, and practical push pin construction that is specifically designed for use with cubicle walls by virtue of an anchoring section formed on an intermediate section of the push pin shaft.

As anyone who has attempted to pin notices on a cubicle wall is all too well aware, the construction of conventional padded cubicle walls is not particularly receptive to providing a firm grasp on a straight shafted push pin, particularly when the push pin is intended to support multiple sheets of paper in the form of notices, spread sheets, or the like.

As a consequence of the foregoing situation, there has existed a longstanding need among office workers for a new and improved push pin construction that employs an intermediate anchor section along the length of the push pin shaft wherein the anchor section firmly engages the fabric covered exterior of a cubicle wall, and the provision of such a construction is the stated objective of the present invention.

BRIEF SUMMARY OF THE INVENTION

Briefly stated, the push pin construction that forms the basis of the present invention comprises, in general, a shaft unit having an intermediate section and an enlarged head unit.

As will be explained in greater detail further on in the specification, the shaft unit includes an elongated shaft member having a pointed outboard end which is aligned with a blunt inboard end and having a helical anchor section formed intermediate the ends plus a flattened flange formed between the helical anchor section and the blunt inboard end for affixing the shaft unit to the enlarged head unit.

In addition, the head unit comprises an elongated enlarged head member that captively surrounds the flattened flange and blunt inboard end of the shaft member and includes a distal end having an outwardly projecting lip, a contoured intermediate portion and proximal end having an outwardly projecting tab for twisting the helical anchor section into engagement with a cubicle wall after the pointed end of the shaft member has penetrated the cubicle wall, wherein the tab is further provided with an aperture for suspending diverse articles from the push pin construction.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the push pin construction of this invention in use;

FIG. 2 is an enlarged detail view illustrating the penetrating engagement of the shaft unit with a cubicle wall;

FIG. 3 is a cross-sectional view taken through line 3—3 of FIG. 2; and

FIG. 4 is a top plan view of a plurality of shaft units fabricated from a length of thin metal rod.

DETAILED DESCRIPTION OF THE INVENTION

As can be seen by reference to the drawings, and in particular to FIGS. 1 and 2, the push pin construction that forms the basis of the present invention is designated generally by the reference number 10. The construction 10 comprises, in general, a shaft unit 11 and a head unit 12. These units will now be described in seriatim fashion.

As shown in FIGS. 3 and 4, the shaft unit 11 comprises an elongated shaft member 20 fabricated from an elongated metal rod 21 and having a pointed outboard end 22, a generally blunt inboard end 23 and a helical shaped anchor section 24 formed intermediate the inboard 23 and outboard 22 ends.

In addition, the shaft member 20 further includes a flattened flange portion 25 disposed proximate to, but spaced from, the inboard end 23 of the shaft member 20 at a point between the helical section 24 and the inboard end 23 of the shaft member 20 for reasons that will be explained presently.

Turning now to FIGS. 2 and 3, it can be seen that the head unit 12 comprises an enlarged elongated push head member 30 preferably fabricated from plastic 31 and fixedly secured to both the inboard end 23 and the flattened flange portion 25 of the shaft member 20 wherein the flattened flange portion 25 fixedly secures the shaft member 20 within the push head member 30 and prevents the rotation of the shaft member 20 relative to the push head member 30 in a well-recognized fashion.

In addition, the distal end of the push head member 30 is provided with an outwardly projecting peripheral lip 32; the proximal end of the push head member 30 is provided with an outwardly projecting tab 33 having an aperture 34, and the intermediate portion of the push head member 30 is provided with a contoured surface 35 that may be ribbed, knurled, etc., to enhance the user's frictional grasp thereon in a well-recognized manner.

Returning once more to FIGS. 1 and 2, it can be appreciated that the push pin construction 10 of this invention permits the user to easily penetrate a cubicle wall 100 with the pointed end 22 of the shaft member 20, wherein the helical anchor section 24 is rotated by either the intermediate contoured portion 35 or the outwardly projecting apertured tab 33 of the push head member 30 to engage the anchor section 24 with the cubicle wall 100 to prevent the push pin construction 10 from pulling out of the cubicle wall 100 when a number of sheets of paper 200 are secured to the cubicle wall 100 by the push pin construction.

In addition, the apertured tab 33 on the proximal end of the push head member 30 is adapted to suspend various articles 50 having a hook or looped clasp that will pass through the aperture 34 in the tab 33 from the push pin construction 10 when it is operatively engaged with a cubicle wall 100.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

We claim:

1. A push pin construction for releasably engaging at least one sheet of material to a cubicle wall wherein the construction comprises:

a shaft unit including a generally uniform diameter elongated shaft member having a generally straight pointed outboard end aligned with a generally straight inboard end and a helical anchor section formed intermediate said generally straight inboard and outboard ends; and a head unit including an enlarged push head member fixedly secured to said inboard end of the shaft member.

2. The construction as in claim 1, wherein the elongated shaft member is further provided with a flattened flange portion disposed intermediate the helical anchor section and the inboard end of the shaft member.

3. The construction as in claim 2, wherein the flattened flange portion of the shaft member is embedded within the enlarged push head member.

4. The construction as in claim 3, wherein the push head member is provided with a contoured intermediate portion.

5. The construction as in claim 4, wherein the push head member has a distal end provided with an outwardly projecting peripheral lip.

6. The construction as in claim 5, wherein the push head member has a proximal end provided with an outwardly projecting tab.

7. The construction as in claim 6, wherein the outwardly projecting tab is provided with an aperture.

8. The construction as in claim 1, wherein the push head member is provided with a contoured intermediate portion.

9. The construction as in claim 8, wherein the push head member has a distal end provided with an outwardly projecting peripheral lip.

10. The construction as in claim 9, wherein the push head member has a proximal end provided with an outwardly projecting tab.

11. The construction as in claim 10, wherein the outwardly projecting tab is provided with an aperture.

12. The construction as in claim 1, wherein the push head member has a distal end provided with an outwardly projecting peripheral lip.

13. The construction as in claim 1, wherein the push head member has a proximal end provided with an outwardly projecting tab.

14. The construction as in claim 13, wherein the outwardly projecting tab is provided with an aperture.

* * * * *